United States Patent [19]
Plum et al.

[11] 3,870,736
[45] Mar. 11, 1975

[54] METHOD FOR MAKING ORGANOTIN THIOGLYCOLLIC ACID ESTERS

[75] Inventors: Hans Plum, Heessen; Friedrich Runggas, Dortmund, both of Germany

[73] Assignee: Schering AG, Berlin and Bergkamen, Germany

[22] Filed: Jan. 14, 1974

[21] Appl. No.: 432,824

[30] Foreign Application Priority Data
Jan. 20, 1973 Germany.............................. 2302749

[52] U.S. Cl. ...................... 260/429.7, 260/45.75 K
[51] Int. Cl. ............................................... C07f 7/22
[58] Field of Search ................................. 260/429.7

[56] References Cited
UNITED STATES PATENTS

| | | | |
|---|---|---|---|
| 2,832,750 | 4/1958 | Weinberg et al. | 260/429.7 |
| 2,832,751 | 4/1958 | Weinberg et al. | 260/429.7 |
| 2,870,119 | 1/1959 | Leistner et al. | 260/429.7 |
| 3,530,157 | 9/1970 | Hoch | 260/429.7 |

*Primary Examiner*—Daniel E. Wyman
*Assistant Examiner*—A. P. Demers
*Attorney, Agent, or Firm*—Curtis, Morris & Safford

[57] ABSTRACT

A method for making organotin thioglycollic acid esters, useful as stabilizers for polyvinyl chloride, by reacting a tetraalkyl tin compound with a tin tetrathioglycollic acid ester.

6 Claims, No Drawings

METHOD FOR MAKING ORGANOTIN THIOGLYCOLLIC ACID ESTERS

The present invention relates to a method for making organotin thioglycollic acid esters.

Vinyl chloride polymers and other chlorine-containing polymers are thermally unstable compounds which lose gaseous hydrogen chloride by cleavage when heated to the temperatures used for working up these materials. This results in a darkening of the polymers; the physical properties thereof are also considerably worsened.

The decomposition of vinyl chloride polymers can be hindered by the addition of certain materials such as barium and cadmium compounds, lead salts, or organotin compounds. However, the most effective stabilizers have proved to be organotin mercapto compounds, e.g. dialkyl tin thioglycollic acid esters of the formula $R_2Sn(SCH_2COO\text{-}iC_8H_{17})_2$, in which R is butyl, octyl, or methyl, for example. These compounds, when added in an amount of about 1 percent, permit the suppression of hydrogen chloride cleavage on heating polyvinyl chloride to such an extent that working up of the polymers to completely colorless and clear products is possible.

The preparation of the organotin mercapto compounds is, however, a very complicated multi-step process and requires considerable technical effort. The starting materials are tetraalkyl tin compounds of the formula $SnR_4$. By reaction with $SnCl_4$ at elevated temperatures according to the reaction

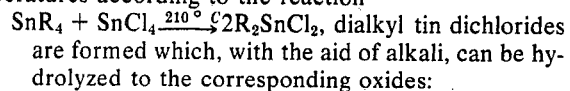

dialkyl tin dichlorides are formed which, with the aid of alkali, can be hydrolyzed to the corresponding oxides:

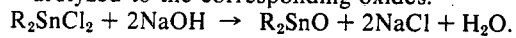

By reaction with mercapto compounds such as, for example, thioglycollic acid esters of the type $HSCH_2COO\text{-}iC_8H_{17}$ the finished stabilizers are obtained from the oxides:

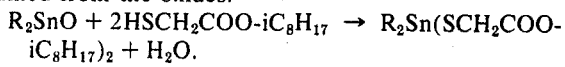

A feature of the present invention is a method for the making of organotin thioglycollic acid esters which is considerably less complicated than the known method and which permits a very economical manufacture of these polyvinyl chloride stabilizers.

The surprising discovery has been made that tin tetraalkyl compounds can be reacted at temperatures from about 100°C. to about 250°C. with tin tetrathioglycollic acid esters to form alkyl tin thioglycollic acid esters. The alkyl groups can contain from 1 – 14 carbon atoms. The alcohol components of the esters can be branched higher alcohols, preferably having from 4 to 10 carbon atoms. Esters of i-octyl alcohol are of particular interest.

The reaction can be accelerated by the addition of metal compounds such as $AlCl_3$, $Al(O\text{-}iC_3H_7)_3$, or $BF_3\cdot(n\text{-}C_4H_9)_2O$. The required amount of such accelerators is very low and is in general from 0.1 – 3 percent by total weight of the tin compounds.

The reaction can advantageously be carried out continuously.

The amounts in which the starting materials, $SnR_4$ and tin tetrathioglycollic acid esters, are employed are between about 1:1 and 1:2 mols. These limits are, however, not critical. Small departures from the aforementioned mol ratios lead to no significant worsening of the products obtained.

The organotin thioglycollic acid esters prepared according to the process of the present invention are extraordinarily effective substances for the stabilization of polyvinyl chloride or other chlorine-containing polymers and, even in small amounts, suppress the cleavage of hydrogen chloride. The smooth course of the reaction and the high efficacy of the tin compounds prepared according to the present invention are all the more surprising since, in general, sulfur-containing organotin compounds are thermally labile and decompose with discoloration and the separation of sulfur.

Thus, it was not to be expected that by the heating of tin tetraalkyls with tin tetrathioglycollic acid esters, organotin thioglycollic acid esters showing a high stabilizing effect would be produced.

The tin tetrathioglycollic acid esters used in the method of the present invention can be prepared according to known methods. A particularly advantageous preparation of these tin tetrathioglycollic acid esters is as follows: 120 g of ethylene diamine are added to 260.5 g of $SnCl_4$ dissolved in 2,500 ml of gasoline having a boiling point from 80° – 100°C. ("Esso Solvent 80/100"). The mixture is stirred for 30 minutes and then 816 g of thioglycollic acid isooctyl ester are added and the material is additionally heated for about one hour with reflux. Thereafter, the product is treated with water. The organic phase is separated from the water and the solvent is evaporated. The tin tetrathioglycollic acid isooctyl ester remaining as a residue is filtered through bleaching earth.

A better understanding of the present invention and of its many advantages will be had by referring to the following specific examples given by way of illustration.

EXAMPLE 1

150 g of tetra-n-butyltin are heated with stirring for 3 hours at 210°C. with 400 g of tin tetrathioglycollic acid isooctyl ester. The reaction product is combined with about 2 percent of bleaching earth and subsequently filtered. 435 g of a yellow colored liquid having a tin content of 17.5 percent and a sulfur content of 10.2 percent are obtained. As shown by thin layer chromatography, the product contains about 70 percent of di-n-butyltin thioglycollic acid isooctyl ester.

EXAMPLE 2

150 g of tetra-n-butyltin is heated with 400 g of tin tetrathioglycollic acid isooctyl ester with the addition of 0.5 percent of $Al(O\text{-}iC_3H_7)_3$ for 4 hours at 180°C. After treating with 2 percent of bleaching earth, the product is filtered. 515 g of an organotin compound having a tin content of 18.1 percent are obtained. The product contains about 85 percent of di-n-butyltin thioglycollic acid isooctyl ester.

EXAMPLE 3

80 g of tetra-n-butyltin are heated with 430 g of tin tetrathioglycollic acid isooctyl ester for 5 hours at 180°C. After the addition of 2 percent of bleaching earth, the product is filtered. 425 g of organotin compound containing 52 percent of di-n-butyltin thioglycollic acid isooctyl ester and 35 percent of mono-n-butyltin thioglycollic acid isooctyl ester are obtained.

EXAMPLE 4

31 g of tetra-n-octyltin are heated for 3 hours at 210°C. with 50 g of tin tetrathioglycollic acid isooctyl ester in the presence of 0.5 percent of $Al(O-iC_3H_7)_3$. 73 g of organotin compound having a tin content of 15.2 percent are obtained.

EXAMPLE 5

150 g of tetra-n-octyltin and 400 g of tin tetrathioglycollic acid isooctyl ester are heated for five hours at 165°C. in the presence of 1 percent of $BF_3.(n-C_4H_9)_2O$. 535 g of a bright yellow liquid having a tin content of 18.1 percent are obtained. The product contains 85 percent of di-n-butyltin-, 10 percent of mono-n-butyltin-, and around 5 percent of tri-n-butyltin thioglycollic acid isooctyl ester.

EXAMPLE 6

30 g of tetra-n-butyltin are heated for four hours at 190°C. with 80 g of tin tetrathioglycollic acid isooctyl ester in the presence of 1 percent of $AlCl_3$. The reaction product is combined with 2 percent of bleaching earth and then filtered. About 100 g of organotin compound having a tin content of 17.9 percent are obtained.

STABILIZATION TESTS

For investigation of the stabilizing effect of the organotin compounds, 100 g of a suspension polymer of polyvinyl chloride having a K-value of 70 were mixed with 1 percent of the tin compound to be tested and, after the addition of 2 percent of a lubricating agent, were worked up into a film on a rolling mill at 175°C.

Samples of this polyvinyl chloride film were then heated in a circulating air drying oven at 180°C. for a period of time until the samples were darkly colored. The time required for the development of a dark coloration in the polyvinyl chloride sample is a measure of the stabilizing effect of the compound being tested. The later the polyvinyl chloride samples darken in color, the more effective is the stabilizer.

| Stabilizer | Darkening After |
| --- | --- |
| Product according to Example 1 | 70 minutes |
| Product according to Example 2 | 70 minutes |
| Product according to Example 3 | 60 minutes |
| Product according to Example 4 | 60 minutes |
| Product according to Example 5 | 65 minutes |

COMPARISON TEST

Di-n-butyltin dithioglycollic acid isooctyl ester prepared from dibutyltin oxide and thioglycollic acid isooctyl ester darkened after 65 minutes.

What is claimed is:

1. The method of making an organotin thioglycollic acid ester which comprises reacting a tetraalkyl tin compound with a tin tetrathioglycollic acid ester at a temperature between about 100°C. and about 250°C.

2. The method as in claim 1 wherein the mol ratio of tetraalkyl tin compound to tin tetrathioglycollic acid ester is between 1:1 and 1:2.

3. The method as in claim 1 wherein the reagents are reacted in the presence of 0.1 to 3 percent, by total weight of the tin compounds, of aluminum triisopropylate, aluminum chloride, or $BF_3.(n-C_4H_9)_2O$.

4. The method as in claim 1 wherein said tetraalkyl tin compound is tetrabutyl tin.

5. The method as in claim 1 wherein said tetraalkyl tin compound is tetraoctyl tin.

6. The method as in claim 1 wherein said tin tetrathioglycollic acid ester is tin tetrathioglycollic acid isooctyl ester.

* * * * *